Figure 1:
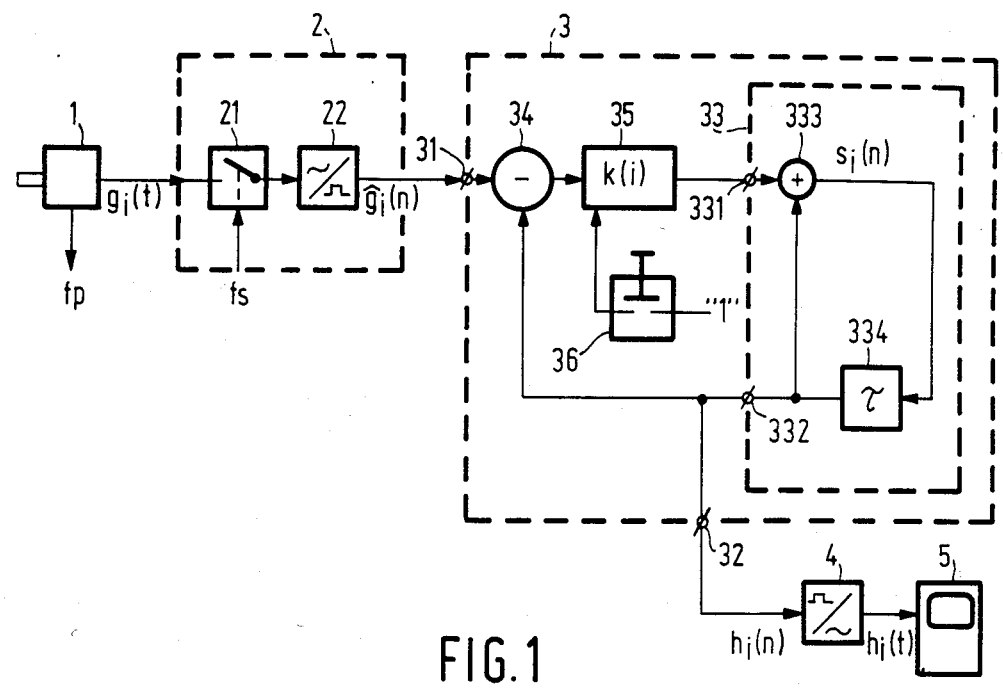

United States Patent [19]

Herrmann et al.

[11] Patent Number: 4,700,229
[45] Date of Patent: Oct. 13, 1987

[54] IMAGE ENHANCEMENT CIRCUIT

[75] Inventors: Jochem Herrmann; Marcellinus J. M. Pelgrom, both of Eindhoven, Netherlands

[73] Assignee: U.S. Philips Corporation, New York, N.Y.

[21] Appl. No.: 879,697

[22] Filed: Jun. 27, 1986

[30] Foreign Application Priority Data

Jul. 9, 1985 [NL] Netherlands .................. 8501956

[51] Int. Cl.$^4$ .................. H04N 5/14; H04N 5/213
[52] U.S. Cl. .................. 358/166; 358/37; 358/284; 358/167; 382/54
[58] Field of Search .......... 358/36, 37, 166, 167, 358/284; 382/54

[56] References Cited

U.S. PATENT DOCUMENTS 4,058,836  11/1977  Drewery et al. .................. 358/167
4,607,284  8/1986  Raven et al. .................. 358/166

OTHER PUBLICATIONS

Bruggemann, Harro.,"Temporal Filtering Using Pixel Incrementing." *J. Soc. Motion Picture and Television Engineers*, pp. 686–694 (Aug., 1981).
Pratt, W. K., *Digital Image Processing*. John Wiley and Sons, pp. 434–437 (1978).

Primary Examiner—James J. Groody
Assistant Examiner—Michael D. Parker
Attorney, Agent, or Firm—Marc D. Schechter

[57] ABSTRACT

An image enhancement circuit for eliminating noise from a series of image signals $g_i(t)$ representing images of a quasi-stationary object in a noisy environment. The image enhancement circuit is provided with an accumulator circuit and a weighting circuit. The weighting circuit receives a difference signal indicating the difference between the actual image signal $g_i(n)$ and the output signal $h_i(n)$ of the accumulator circuit. In the weighting circuit, the difference signal is multiplied by a weighting factor $k(i)$ which is dependent on the ordinal number i of the actual image signal $g_i(n)$. For example, $k(i) = 1/i$. The weighted difference signal is then added to the accumulator.

9 Claims, 3 Drawing Figures

IMAGE ENHANCEMENT CIRCUIT

A. BACKGROUND OF THE INVENTION

A(1). Field of the Invention

The invention relates to an image enhancement circuit. Such circuits are used to produce a high quality, image from a plurality of quasi-stationary low quality images. For example, let it be assumed that a high-quality TV image is desired of an object which is at a long distance from a TV camera. When the atmosphere is quiet (as with light frost), a high quality image can generally be obtained without image enhancement. However, if the atmosphere is very turbulent (as on very hot days) a low quality is generally produced, with the image being highly degraded by noise. To obtain an image of high quality under such circumstances, a plurality of low quality images of this object is processed in the image enhancement circuit.

Similar situations occur in scanning electron microscopy, X-ray fluoroscopy and in astronomy.

A(2). Description of the Prior Art

A known method of obtaining an image of high quality from a series of low-quality images is described on page 434 of a book by W. K. Pratt entitled *Digital Image Processing* (John Wiley and Sons, 1978). In this method, the average value is of the series of low-quality images is calculated. This may lead to the desired result, which is evident as follows. For the i-th low-quality image $G_i(x,y)$, $$G_i(x,y) = H(x,y) + N_i(x,y) \tag{1}$$

In this equation $H(x,y)$ represents the desired high-quality image and $N_i(x,y)$ represents an additive noise image which is independent of the high-quality image. When the desired high-quality image is constant for a series of M low-quality images, $$H(x, y) = \frac{1}{M} \sum_{i=1}^{M} G_i(x, y) - \frac{1}{M} \sum_{i=1}^{M} N_i(x, y) \tag{2}$$

For a high value of M, the noise term on the right-hand side approximates zero under normal circumstances, so that:

$$H(x, y) = \frac{1}{M} \sum_{i=1}^{M} G_i(x, y) \tag{3}$$

A device for performing the above-mentioned method will generally comprise a circuit for scanning the low-quality images $G_i(x,y)$ in an image scan period $T_b$, for generating low-quality image signals $g_i(t)$. These signals are weighted in a weighting circuit with a weighting factor 1/M. The low-quality image signals thus weighted are accumulated in an accumulator. After all M low-quality image signals have been applied to this accumulator, the supply of further low-quality image signals is impeded. At that moment, the output of the accumulator supplies a high-quality image signal f(t) which represents the desired high-quality image H(x,y). The high-quality image can be displayed by applying f(t) to a monitor.

As has been described on page 686 of an article by H. Bruggemann entitled "Temporal Filtering Using Pixel Incrementing" (*Journal of the Society of Motion Picture and Television Engineers*, pages 686-694 (August, 1981), a drawback of this known image enhancement circuit is that the desired brightness of the image cannot be obtained until after all M weighted low-quality image signals are accumulated. A further drawback of this known circuit is that the optimum value of M is not always known in advance. In fact, this will be greatly dependent on the circumstances.

B. OBJECT AND SUMMARY OF THE INVENTION

It is an object of the invention to provide an image enhancement circuit in which a high-quality image signal is continuously obtained.

To this end, the image enhancement circuit according to the invention further comprises a difference-producing circuit to which the low quality signals as well as the output image signals occurring at the output of the accumulator are applied. An output image signal is subtracted from each low-quality image signal to generate difference image signals which are applied to the weighting circuit in which these difference image signals are weighted by a weighting factor of k(i). The magnitude of K(i) is dependent on the ordinal number of the relevant difference image signal.

By assuming the weighting factor for the i-th difference image signal to be equal to 1/i, the output signal of the accumulator continuously represents the average of all low-quality image signals applied up to that moment to this image enhancement circuit so that the image on the monitor continuously has an optimum brightness. In addition the accumulation process may now be interrupted at any desired moment.

In a preferred embodiment of the image enhancement circuit according to the invention, the weighting factors are chosen to be equal to integral negative powers of two, particularly as follows:

$$k(i) = 2^{-RND[^2\log i]} \tag{4}$$

In this equation RND represents a rounding-off operation; in other words $RND[^2\log i]$ is the rounded-off value of $^2\log i$. The weighting factors determined in this manner successively have the value $$1, \tfrac{1}{2}, \tfrac{1}{4}, \tfrac{1}{4}, \tfrac{1}{4}, \tfrac{1}{8}, \tfrac{1}{8}, \tfrac{1}{8}, \tfrac{1}{8}, \ldots \tag{5}$$

It is true that the image enhancement circuit throretically does not yield the same image quality when $k(i) = 1/i$ when the latter weighting factors are used, but in practice the difference in quality can hardly be ascertained, also because the accumulation process is not to be stopped after a given period, the weighting circuit can be cnsiderably simplified by this choice of the weighting factors.

D. BRIEF DESCRIPTION OF THE DRAWING

FIG. 1 schematically shows a television recording and display system provided with an image enhancement circuit according to the invention.

Figure 2:
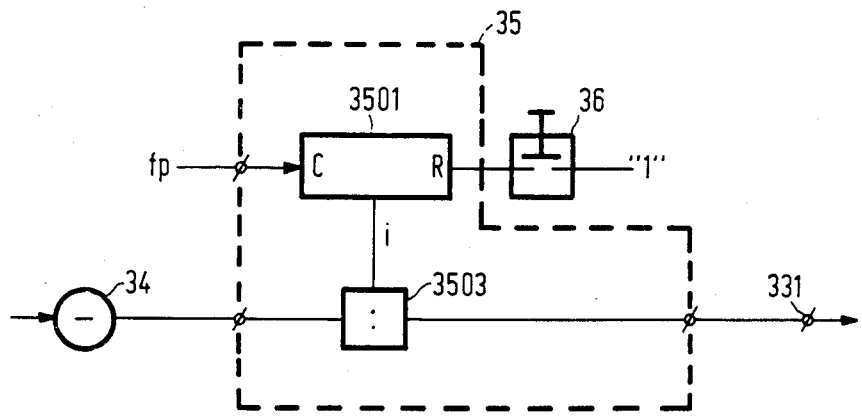
Figure 3:
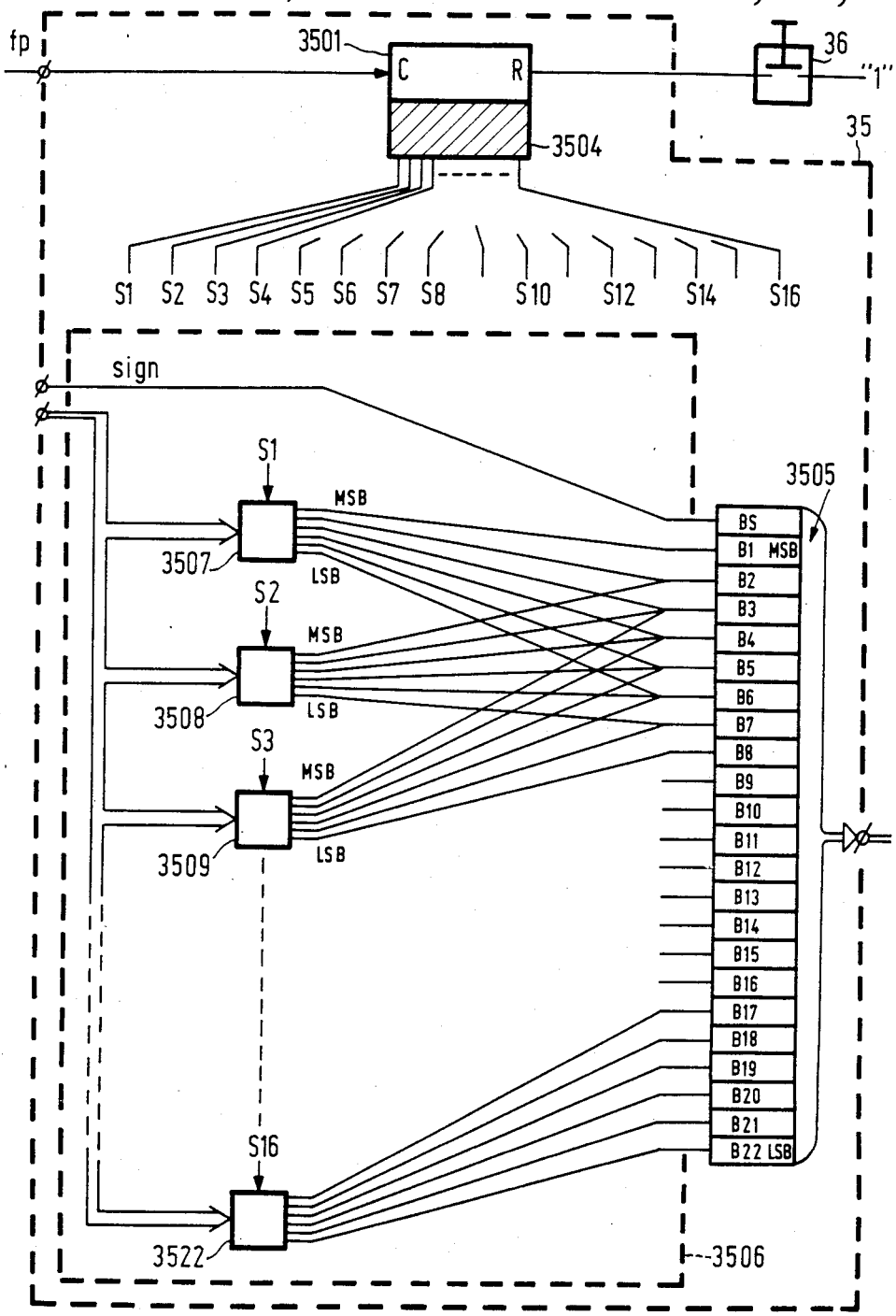

FIGS. 2 and 3 schematically show embodiments of portions of an image enhancement circuit according to the invention.

E. DESCRIPTION OF THE PREFERRED EMBODIMENTS

FIG. 1 shows a TV system. The system comprises a TV camera 1 which converts a series of images $G_i(x,y)$ of one and the same objects at a rate of, for example, 25

Hz into a series of analog image signals $g_i(t)$. Reference i represents the ordinal number of the image signal. For this conversion, the image $G_i(x,y)$ is scanned in a line pattern.

After the image $G_i(x,y)$ is scanned and the image signal $g_i(t)$ is obtained, the image will have changed slightly. This new image will be indicated by $G_{i+1}(x,y)$. After scanning by the TV camera, the camera yields the image signal $g_{i+1}(t)$. In addition to these image signals, the TV camera supplies a frame-synchronizing pulse $f_p$ whenever scanning of a new image is started.

The analog image signals $g_i(t)$ thus obtained are converted in a circuit 2 into time-discrete image signals $\hat{g}_i(n)$. To this end, this circuit 2 includes a sampler 21 which is controlled by sampling pulses at a rate $f_s$ of, for example, 13.5 MHz. In the embodiment shown, this circuit 2 further includes an analog-to-digital converter 22 in which each image signal sample thus obtained is converted into a code word of, for example, 7 bits.

The time-discrete image signals which are supplied by the circuit 2 are applied to the input 31 of the image enhancement circuit 3. The output 32 thereof is connected to the monitor 5 via a digital-to-analog converter 4.

The image enhancement circuit 3 has an accumulator 33. In response to the i-th image signal $\hat{g}_i(n)$, the accumulator 33 yields the i-th approximation $h_i(n)$ of the desired image signal $h(n)$ which represents the image $H(x,y)$.

The accumulator 33 has an input 331, an output 332, and an adder circuit 333. Adder 333 has a first input connected to the input 331 of the accumulator and a second input connected to the output 332 of the accumulator. Accumulator 33 also has a delay circuit 334 having a delay time $T_b$ which is equal to the duration of an image signal. The input of delay circuit 334 is connected to the output of the adder circuit 333. The output of delay 334 is connected to the output 332 of the accumulator.

The image enhancement circuit further includes a difference producing circuit 34. A first input of difference circuit 34 is connected to the input 31 of the image enhancement circuit. A second input of difference circuit 34 is connected to the output 32 of the accumulator 33. The output of this difference producing circuit 34 is connected via the weighting network 35 to the input 331 of the accumulator.

The weighting network 35 provides a weighting factor $k(i)$ dependent on the ordinal number i of the low-quality image signal. With the aid of a switch 36, which can be operated by the user, the weighting factor can be set to a given starting position and can be maintained in this position, if desired, by leaving this switch permanently operated.

It will be assumed that the weighting factor at the start is equal to $k(0)=0$. Since the first synchronizing pulse $f_p$ occurs after switch 36 has opened, i becomes 1 and, starting from the assumption that $k(i)=1/i$, the first weighting factor becomes equal to $k(1)=1$. The image signal $\hat{g}_i(n)$ is then stored unchanged in the delay circuit 334.

After the next frame synchronizing pulse $f_p$, the stored image signal is input together with $\hat{g}_2(n)$ to the difference producing circuit 34. Circuit 34 then supplies the difference signal $\hat{g}_2(n)-\hat{g}_1(n)$. This difference signal is multiplied by the new weighting factor $\frac{1}{2}$, and is applied to the adder circuit 333 where the image signal $\hat{g}_1(n)$ is added to this difference signal. The sum signal $$s_2(n) = \tfrac{1}{2}[\hat{g}_1(n)+\hat{g}_2(n)]$$

thus obtained is applied to the delay circuit 334. After the next frame synchronizing pulse, $s_2(n)$ is applied as an image signal $h_2(n)$ to the monitor 5 via the digital-to-analog converter 4.

As can be easily derived from the above, it generally holds that $$h_i(n) = \frac{1}{i} \sum_{q=1}^{i} \hat{g}_q(n) \qquad (6)$$

When the quality of the image $H_i(x,y)$ corresponding to $h_i(n)$ and visible on the monitor 5 is considered to be sufficient by the user, switch 6 can be closed again so that the image $H_i(x,y)$ does not change anymore. As is evident from equation (6), $h_i(n)$ is the average value at any moment of all image signals $\hat{g}_1(n)$ received until that moment, so that the image $H_i(x,y)$ has an optimum brightness.

An embodiment of the weighting circuit 35 in the case where $k(i)=1/i$ is shown in FIG. 2. It comprises a counter 3501 having, for example, 16 bits. The frame synchronizing pulses $f_p$ are applied to the counting input C. This counter can be reset, for example, by applying a logical "1" to the reset input R. For this purpose switch 36 is provided which is operated by the user.

The counter thus supplies the ordinal number i of image signal $g_i(t)$ which is applied to the image enhancement circuit since switch 6 was last closed. This number i, together with the difference signal provided by the difference producing circuit 34, is applied to a divider circuit 3503. Divider 3503 thus supplies the difference signal weighted by the weighting factor $1/i$.

It is to be noted that the $2^{16}$ frame synchronizing pulses that can be counted by this 16-bit counter correspond to 65536 images. Transmission thereof takes approximately 43 minutes. Therefore, in this case the user must determine within approximately 43 minutes whether there is an image satisfying his wishes.

In the weighting circuit shown in FIG. 2, $k(i)=1/i$ and therefore the circuit provided with a divider circuit 3503. Although divider circuits are generally known, they remain relatively complicated circuits. In addition it takes a relatively long time to carry out a division.

A considerably simpler embodiment of the weighting circuit is obtained by choosing the weighting factors to correspond to equation (4) which leads to the series of weighting factors indicated in equation (5). This choice of the weighting factors not only considerably simplifies the weighting circuit design, but in addition considerably increases its speed.

An embodiment of the weighting circuit in which the weighting factors have the values of equations (4) and (5) is shown in FIG. 3. In this embodiment it has been assumed for the sake of simplicity that both the difference signal samples, which are supplied by the difference producing circuit 34, and the weighted difference signal samples, such as are applied by the weighting circuit, are all represented in sign and magnitude and are located between $+1$ and $-1$.

The weighting circuit shown in FIG. 3 again comprises the 16-bit counter 3501 which receives the frame synchronizing pulses $f_p$ at its counting input C and which can be reset by applying a logical "1" to the reset input R for a short period. Here again switch 36 is provided which is operated by the user, but it only conducts for a short period.

A decoding network 3504, having sixteen outputs indicated by S1 to S16, respectively, is connected to the counter 3501. A logical "1" occurs at output S1 when the count is one. If the count is two, a logical "1" occurs at the output S2. A logical "1" occurs at the output S3 when the count is 3, 4, and 5. Thus, in general a logical "1" appears at output Sn, where $n = RND(^2\log i) + 1$, when the count is i. (See, equations (4) and (5).)

The weighting circuit further includes a 23-bit output register 3505 whose contents (being the weighted difference signal samples) are transmitted in parallel to the adder 333 (see FIG. 1). This output register has a bit cell for each of the 23 bits. These cells are indicated by BS, B1, B2, ... B22, respectively. Bit cell BS comprises the sign bit, bit cell B1 comprises the most signigicant bit MSB and bit cell B22 comprises the least significant bit LSB.

Of each 7-bit difference signal sample which is supplied by the difference producing circuit 34, the sign bit is directly applied to bit cell BS. The other six magnitude bits are applied via a routing circuit 3506 to certain other bit cells of the output register 3505. To this end, this routing circuit includes sixteen gating circuits 3507-3522. Each gating circuit has six inputs for receiving the six magnitude bits of the difference signal in parallel. For the sake of completeness FIG. 3 shows at which of the gating currents' outputs the MSB is present and at which the LSB is present.

The gating circuits are controlled by the signals at the outputs of the decoding network 3504. More particularly the six magnitude bits are applied to the bit cells B1-B6 of output register 3505 when output S1 has a logical "1". If on the other hand output S2 has a logical "1", these six magnitude bits are applied to the bit cells B2-B7 (thus dividing by 2). When output S3 has a logical "1", they are applied to the bit cells B3-B8 (thus dividing by 4). Thus, in general, the six magnitude bits of the difference signal are applied to bit cells $Bn - B(n+5)$ of output register 3505 when output Sn is a logical "1". The gating circuits are designed in such a manner that gating circuits receiving a logical "0" do not receive any of the six magnitude bits.

It is to be noted that it has been assumed for the sake of simplicity in this embodiment that the difference signal samples are represented with sign and magnitude. The twos-complement representation, however, is generally used in practice.

It is also to be noted that the time delay element 334 (see FIG. 1) may alternatively be a digital image memory.

What is claimed is:

1. An image enhancement circuit for converting a series of quasi-stationary low-quality image signals into an image signal of high quality, comprising an input for reception of the low-quality image signals; an output at which the high-quality image signal occurs; a difference-producing circuit having a first input coupled to the input of the image enhancement circuit, a second input and an output; a weighting network for weighting signals applied thereto with a certain weighting factor and having an input which is coupled to the output of the difference-producing circuit and having an output; an accumulator circuit having an input coupled to the output of the weighting network and an output coupled to the output of the image enhancement circuit and to the second input of the difference-producing circuit, characterized in the weighting factor of the weighting circuit depends on the ordinal number of the received low-quality image signal.

2. An image enhancement circuit as claimed in claim 1, characterized in that the weighting factor is equal to the reciprocal value of the ordinal number of the received low-quality image signal.

3. An image enhancement circuit as claimed in claim 1, characterized in that the weighting factor is equal to $2^{-RND(^2\log i)}$, where i is the ordinal number of the low-quality image received, $^2\log i$ is the logarithm of i in base 2, and $RND(^2\log i)$ is the logarithm of i in base 2 rounded to the nearest integer.

4. An image enhancement circuit for converting a series of quasi-stationary low-quality image signals into a high-quality image signal, said circuit comprising:
   an input for receiving a low-quality image signal;
   an output for providing a high-quality image signal;
   means for subtracting the high-quality image signal from the low-quality signal, said subtraction means having an output for providing a difference signal;
   means for multiplying the difference signal by a weighting factor, said weighting factor being a function of the ordinal number of the low-quality image signal received, said multiplication means having an output for providing a weighted difference signal;
   means for adding the weighted difference signal to the high-quality image signal, said adding means having an output for providing a sum signal; and
   time delay means for receiving the sum signal and for outputting the sum signal as the high-quality image signal, said sum signal having a time duration, said time delay being equal to the time duration of the sum signal.

5. An image enhancement circuit as claimed in claim 4, characterized in that the weighting factor is equal to the reciprocal of the ordinal number of the low-quality image received.

6. An image enhancement circuit as claimed in claim 4, characterized in that the weighting factor is equal to $2^{-RND(^2\log i)}$, where i is the ordinal number of the low-quality image received, $^2\log i$ is the logarithm of i in base 2, and $RND(^2\log i)$ is the logarithm of i in base 2 rounded to the nearest integer.

7. An image enhancement circuit for converting a series of quasi-stationary low-quality image signals into a high-quality image signal, said circuit comprising:
   an input for receiving a current low-quality image signal;
   an output for providing a current high-quality image signal;
   means for subtracting the current high-quality image signal from the current low-quality signal, said subtraction means having an output for providing a current difference signal;
   means for multiplying the current difference signal by a weighting factor, said weighting factor being a function of the ordinal number of the low-quality image signal received, said multiplication means having an output for providing a current weighted difference signal; and
   means for adding the current weighted difference signal to the current high-quality image signal, said adding means having an output for providing the next high-quality image signal.

8. An image enhancement circuit as claimed in claim 7, characterized in that the weighting factor is equal to the reciprocal of the ordinal number of the current low-quality image.

9. An image enhancement circuit as claimed in claim 7, characterized in that the weighting factor is equal to $2^{-RND(^2\log i)}$, where i is the ordinal number of the current low-quality image received, $^2\log i$ is the logarithm of i in base 2, and $RND(^2\log i)$ is the logarithm of i in base 2 rounded to the nearest integer.

* * * * *